March 16, 1943.　　R. H. BURROUGHS, JR　　2,313,800
AIRCRAFT CONTROL
Filed March 27, 1940　　2 Sheets-Sheet 1
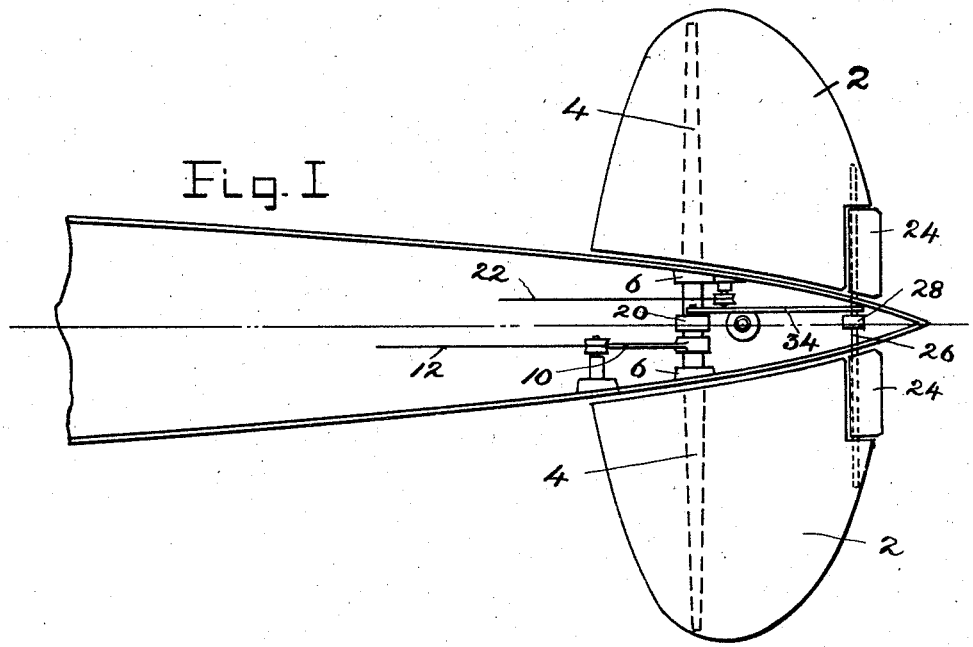
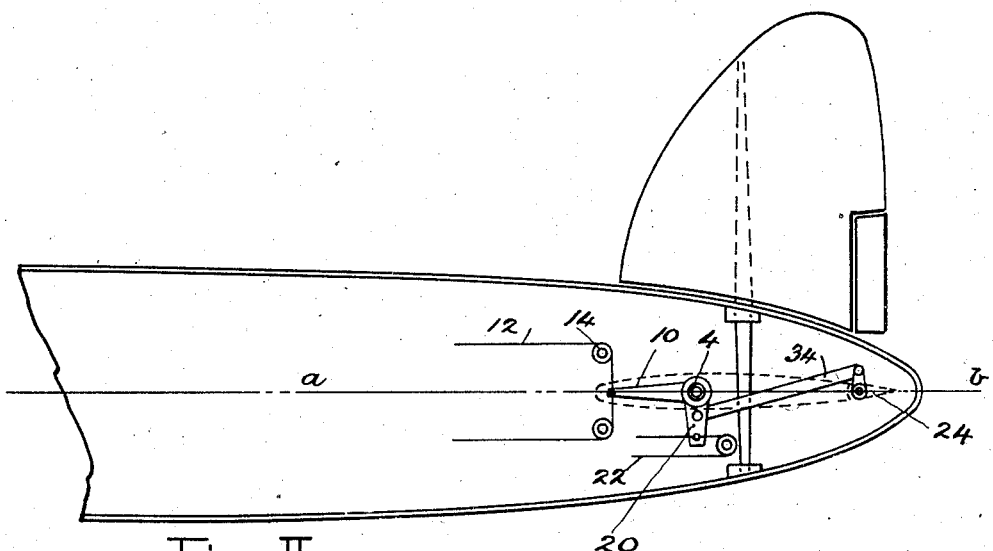
INVENTOR
RICHARD H. BURROUGHS, JR.
BY
Arthur Scrivner
ATTORNEY March 16, 1943. R. H. BURROUGHS, JR 2,313,800
AIRCRAFT CONTROL
Filed March 27, 1940 2 Sheets—Sheet 2
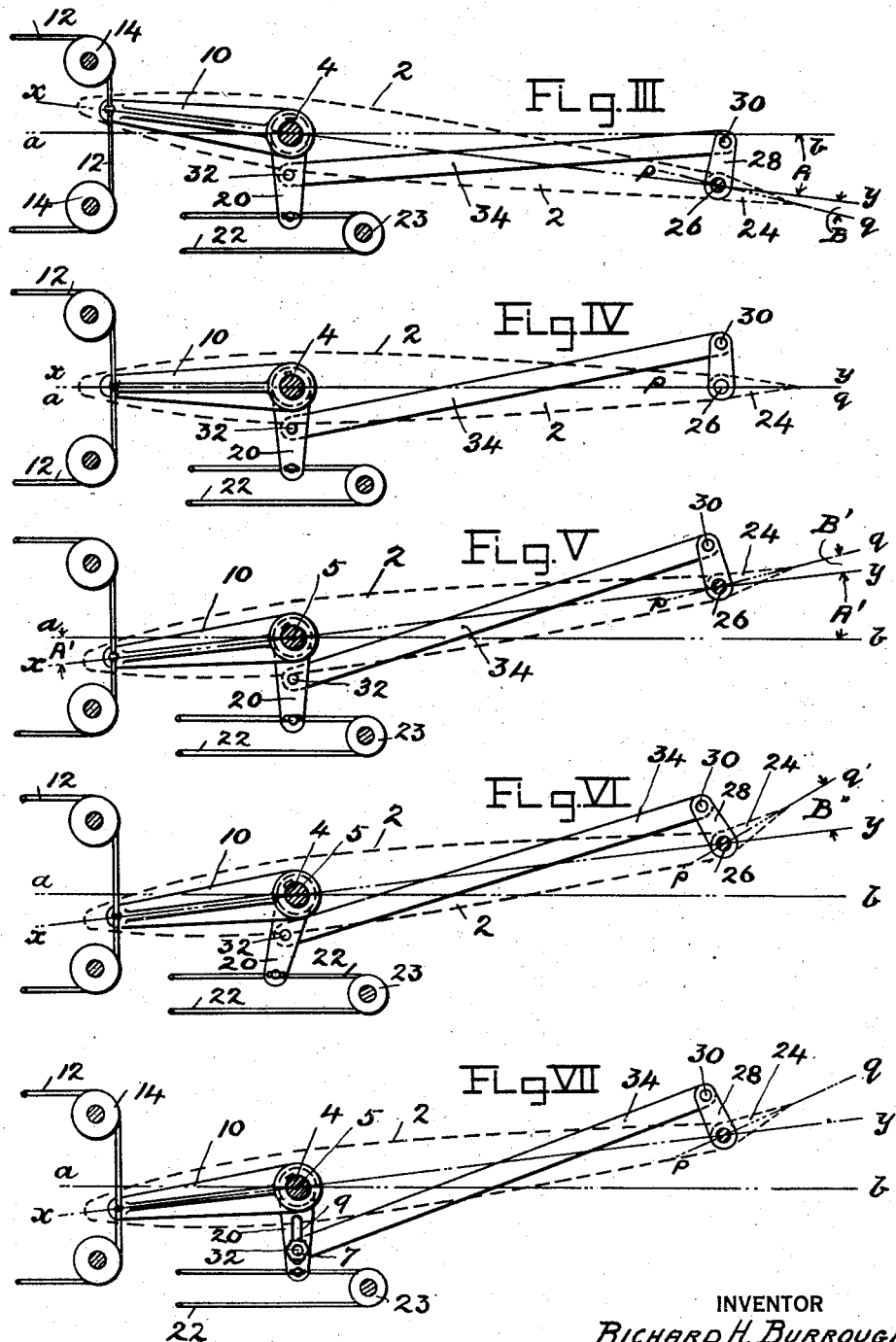
INVENTOR
RICHARD H. BURROUGHS, JR.
BY
Arthur Scrivenor
ATTORNEY Patented Mar. 16, 1943

2,313,800

UNITED STATES PATENT OFFICE 2,313,800

AIRCRAFT CONTROL

Richard H. Burroughs, Jr., Oakland, Calif.

Application March 27, 1940, Serial No. 326,118

5 Claims. (Cl. 244—82)

My invention relates to aircraft, and it pertains particularly to the longitudinal equilibrium of aircraft in flight; that is, to balance about the lateral axis.

Since the center of gravity and the center of pressure of an airplane in flight seldom coincide, the airplane, if unprovided with stabilizing surfaces, is in an unstable condition.

A common practical means for controlling the unstable longitudinal equilibrium of aircraft is the auxiliary surface known as the stabilizer—which now is usually fixed with respect to the fuselage—and the elevator, the position of which in relation to the longitudinal axis of the plane is under the control of the pilot. The stabilizer provides stability and balance, and the elevator is used for longitudinal control. The elevator, however, when deflected in order to maneuver the airplane, opposes the action of the stabilizer which tends to keep the airplane in steady flight. This in turn requires that the elevator shall be of a larger size than would be required were there no stabilizer.

My invention has for an object the combining of the functions of stability, control, and trim into one surface smaller than the conventional horizontal tail surfaces. Other objects are to provide an airfoil which shall be practically free from the blanketing to which the conventional elevator is subject; to increase the sensitivity of the control and of the maneuverability of the airplane; to provide means by which the pilot may adjust the trim of his ship for various conditions of steady unaccelerated flight, and means by which the pilot may adjust the angle of deflection of the rear surface of the airfoil for a given movement of the said airfoil; to reduce tail-group weight, and tail-group drag; to reduce the costs of fabrication; and to provide a simple means for stability, control, and trim.

With a constant center-of-pressure airfoil hinged at a point close to its center-of-pressure position, the hinge moments are very slight at normal angles of attack. With controls free the pilot must constantly apply a stick load for trimming the ship longitudinally. If the trimming load is applied by a bungee, then the predominating hinge moment would be that caused by the bungee, and the feel of the controls is obliterated. That is: the control force required would be independent of the air speed; a condition recognized as objectionable and as dangerous by all pilots.

To overcome these difficulties I employ a single airfoil, to the trailing edge of which I hinge an automatically operated trailing tab. This type of control surface I name my stabilator, because it combines the functions of both stabilizer and elevator; and in addition it has properties not possessed by the stabilizer and elevator.

In the drawings, which form a part of this specification: Figure I shows my stabilator, in plan, installed on the tail of an airplane; and Figure II shows the same in elevation and part section. Figures III to VI inclusive show the stabilator trimmed to four different positions, in elevation and in part section. Figure VII, in elevation and in part section, shows the effect of the adjustment of a part of my stabilator.

In Figures II to VII inclusive the stabilator is shown in dotted lines, as it is beyond and outside the wall of the tail; while the parts shown in full lines are inside the tail.

These drawings show my stabilator as applied to an airplane for the control of longitudinal equilibrium. The rudder control may be constructed and operated in the same manner; and the same type of control may be applied to other forms of aircraft, and also to submarines. For our purposes, in this specification, my stabilator will be described as applied to an airplane.

In the several figures, the numeral 2 shows the principal surface of my stabilator, which is rigidly attached to the rotatable spar 4, which is mounted in bearings 6 attached to the walls of the tail of the airplane. On the spar 4 is clamped or keyed a lever arm 10, at a point within the tail. To the arm 10 I attach the control cables 12, which run over sheaves 14, and are led to the cockpit and to within reach of the pilot. It will be seen that when the end of the lever 10 is moved upward or downward by a pull on the control cables 12, so will the nose of the stabilator 2 be moved upward or downward. The amount of movement may be seen in the drawings by referring to the line a—b drawn through the center of the pivotal point of the stabilator, and which also may be taken to represent the center line of pressure.

Swung free, that is pivoted, on the spar 4—or on any other pivot attached at a suitable point with respect to the spar or to the tail of the plane—is a lever-arm 20, the position of which, with reference to the vertical, is to be adjusted by the control cables 22, running over the sheaves 23.

Referring again to Figure I: On the trailing edge of the main stabilator surface 2 is hinged the tab 24, preferably rigidly attached to the hinge-pin 26. On the same hinge-pin is rigidly attached or keyed the tab lever 28. When the tab lever 28 is moved through a given angle, so will the tab 24 be moved through the same angle. The tab lever 28 is provided with a link-pin 30 towards the end away from the hinge-pin 26. On the lever arm 20, which is shown swung on the spar 4, is mounted the link-pin 32. On the two link-pins 30 and 32 is mounted the link 34. This link may be made adjustable as to its length to aid in installing the parts in their proper relative positions. The link-pin 32 is adjustable on lever-arm 20 as to its distance from the pivotal point of the said lever-arm 20, for a purpose to be explained later.

A most important consideration in laying out my stabilator is to make sure that it is pivoted forward of the foremost center-of-pressure position. This position can be found by inspection of the characteristics of the airfoil; and after it has been found, a margin of safety should be allowed to take care of contingencies and to guard against any danger of aerodynamic overbalancing, in which case the center-of-pressure shifts forward.

Referring to Figures III to VII inclusive: the stabilator 2 and the tab 24 are shown in dotted lines as they are outside the wall of the tail. The gear is in full lines. Line $a-b$ may be taken as the line of direction of the air pressure; and line $x-y$ is the center line of the airfoil 2. In Figure IV the stabilator is shown in its neutral position. In Figure III the nose of the stabilator has been raised through an angle A, to raise the tail of the plane. This is done by means of the cables 12, by lifting the end of the lever-arm 10, and so rotating spar 4 and airfoil 2. The lever-arm 20 does not rotate with the spar 4. The hinge-pin 26 has been depressed below the line $a-b$, and the said hinge-pin 26 is now a shorter distance from link-pin 32 than it was when the stabilator was in its neutral position as shown in Figure IV. The link 34 holds the link-pin 30 at an unchanged distance from the link pin 32; the said link-pin 30 is pushed rearward with respect to its original position and that of the hinge-pin 26; and the tab 24 is deflected so that its center line $p-q$ forms an angle B with and below the center line $x-y$ of the airfoil 2. The tab 24 now tends to restore the airfoil to its original neutral position.

In Figure V the nose of the stabilator is shown depressed through an angle A', to depress the tail of the plane. The lever-arm 20 remains stationary; the hinge-pin 26 has been raised above line $a-b$, and it is now a longer distance from the link-pin 32. Consequently, the link 34 pulls link-pin 30 forward with respect to the position of the hinge-pin 26; and the tab 24 is lifted so that its center line $p-q$ forms an angle B' with and above the center line $x-y$ of the airfoil 2.

It will be seen that with the pivot of the airfoil always forward of the center-of-pressure, the trailing-edge tab is continually adjusted so as to apply an equal and opposite moment counteracting the center-of-pressure moment.

The controls will have adequate "feel," even with a constant center-of-pressure airfoil because the long moment-arm of the tab force combined with that force will imposed loads on the control system which will vary with the air speed. For angles of attack greater than eight to fifteen degrees the center-of-pressure moves rearward and supplies additional restoring moment. Thus with proper proportioning of the system the pilot would have to expand considerable effort to impose severe dynamic loading on the ship by excessive use of the controls at high speed.

In Figure VI it is shown how, with very simple means, the pilot may trim his ship for various conditions of steady unaccelerated flight. This he can do by operating the cable 22 to swing the lever arm 20 on its pivot. In Figure VI the said arm is shown swung forward, which has the effect of pulling the link-pin 32 farther forward with respect to hinge-pin 26, and so elevating the tab 24 until its center line $p-q$ makes an angle B'' with the center line $x-y$ of the airfoil 2. This angle B'' is greater than the angle B' in Figure V. In like manner the pilot may swing the lever arm 20 rearwardly, so that the angle B in Figure III shall be increased, or the angle B' in Figure V shall be reduced; or even so that the tab 24 shall be deflected with respect to the center line $x-y$ of the airfoil 2 when the said airfoil is in its neutral position.

This moving of the position of the lever arm 20 automatically changes the deflection of the tab 24; and the stabilator assumes a new neutral trimming angle of attack with no further effort on the part of the pilot. Since the total fore-and-aft displacement of the link 34 would be small for the entire trimming range, the lever 20 assembly forms a sufficiently sensitive trimming control.

With some craft it may be that it is desirable to change the ratio between the upward and downward angles of deflection of the tab for a given movement of the airfoil control assembly 10 and 12. This I can do by making link-pin 32 adjustable with respect to its distance from the pivotal point 5 of the lever arm 20. This may be done by any known mechanical means of adjustment, such as a bolt 7 adapted to be adjusted in a slot 9, as indicated in Figure VII, the bolt being moved either by hand or by a screw. Supposing that the link-pin 32 is so adjusted with respect to the pivotal point 5 of the lever arm 20 that, for a given angle of deflection of the airfoil 2 above or below line $a-b$, the deflection of the tab 24 will be the same above or below the center line $x-y$ of the airfoil 2; if then the link-pin 32 be moved closer to the pivotal point 5 of the lever arm 20 the tab 24 will be deflected downwardly. And if the link-pin 32 be moved farther from the pivotal point 5 of the lever arm 20, the tab 24 will be deflected upwardly. This will be understood on referring to either of the Figures III to VII inclusive.

Briefly stated: To obtain deflections of the tab above and below the center line $x-y$ for equal positions of the airfoil above and below line $a-b$ the link-pin 32 is adjusted fore-and-aft so as to place it on a curve whose center is the hinge-pin 26, when the airfoil is in the neutral position shown in Figure IV, and whose radius is the distance from the center of the hinge-pin 26 to the center of the pivot 5.

Then, to change the obliquity of the tab relative to the airfoil, for a given movement of the airfoil; the link-pin 32 is moved farther from the pivot 5 to increase the said obliquity; and the link-pin 32 is moved nearer to the pivot 5 to decrease the said obliquity.

Also, to raise the neutral position of the tab with respect to the air foil (Figure IV) I swing the lever-arm 20 towards the rear; or to lower the said neutral position I swing the lever-arm 20 forward. The changing of the neutral position of the tab with respect to the airfoil of course changes the obliquity of the tab with respect to the airfoil for any given position of the said airfoil.

By means of these possible adjustments of the position of the link-pin 32 relative to the center of the pivot 6, the pilot has complete control of the tab-effect.

As a general rule the position of the link-pin 32 on the arm 20 will be adjusted, while the plane is on the ground, to suit the characteristics of the plane and of the airfoil. So I have not shown on the drawings any means for adjusting the position of link-pin 32 on lever-arm 20 from the cockpit. But such means can be provided for. For instance: a means similar to the well known link-motion as applied to locomotives; except that, instead of the link (the lever-arm 20) being adjustable vertically, it is pivoted on the fixed pivot 5; and the link-block (the link-pin 32) is adjustable vertically in the link slot instead of being held at a fixed radius from the center of the rocker-shaft as it is in the locomotive link-motion.

Reference has been made to the neutral angle of attack, or the neutral airfoil-tab position. This is shown in Figure IV of the drawings, in which figure the tab 24 is in line with the airfoil 2. This line is not always coincident with the line a—b. By swinging the arm 20 forward the neutral line is carried below the line a—b; and by swinging the arm 20 towards the rear the neutral line is carried above line a—b—referring to the position aft of the pivot 4.

The tab 24 is shown as a separate part hinged to the airfoil 2. It may be attached to the airfoil in other ways, or it may be constructed as a flexible trailing-edge of the airfoil.

The location of the link 34 is not necessarily that shown. For instance: the arm 20 might be swung to a position above line a—b; and the link-pin 32 would then be above line a—b. Then by locating link-pin 30 below hinge 26 and connecting the pins 32 and 30 with the link 34 we would have the same control of the tab movements. A forward swing of arm 20 would raise the neutral angle of attack, and a rearward movement of arm 20 would depress the neutral angle.

For the purpose of explaining my invention I have shown simple means for swinging the arm 20, and for imparting the desired motions to the airfoil 2 and the tab 24. Other simple and equivalent means may be used.

I claim:

1. In an aircraft: a pair of entire stabilizing surfaces mounted pivotally one on each side of the fuselage and arranged to rotate about their pivot synchronously, the said stabilizing surfaces being pivoted at a point which is adjacent and always ahead of the center of pressure; pilot operable means for rotating the stabilizing surfaces about their pivot, the said means being such as to allow of the movement of the said surfaces by the pressure of the air; a tab hinged to the trailing edge of each of the stabilizing surfaces; link means consisting of an arm pivoted adjacent the stabilizer pivot and projecting below the plane of the chord-line of the stabilizing surfaces; a second lever arm attached to the tab pivot and projecting above the plane of the chord-lines of the stabilizing surfaces; a link pivoted at one end to the first lever arm and at its other end to the second lever arm and crossing the plane of the chord-lines of the stabilizing surfaces so that when the said stabilizing surfaces shall be deflected from their natural angle of attack the tabs shall be automatically deflected in the same direction to counteract the stabilizing surface deflecting force; pilot operable means connected to the first arm of the link-motion to swing the said arm on its pivot to change the position of the second arm relative to the plane of the chord-lines of the stabilizing surfaces; and means mounted on the first arm of the link-motion to change the position of the link pivot on that arm with relation to the position of the arm pivot to adjust the range of the effective movement of the link and of the tab upon any change in the angle between the first arm and the plane of the chord-lines of the stabilizing surfaces.

2. In an aircraft: an entire stabilizer pivoted on the side of the fuselage and at a point on the stabilizer adjacent and ahead of its center of pressure; pilot operable means for rotating the stabilizer on its pivotal point, the said means being such as to allow of the moving of the stabilizer by the pressure of the air; a tab mounted pivotally on the trailing edge of the stabilizer; a first arm pivotally mounted adjacent the fuselage and adjacent the plane of the chord-line of the stabilizer, and projecting to one side of the said plane; a second arm attached to the tab and projecting to the other side of the plane of the chord-line of the stabilizer; a link pivoted by one end and with a movable pivot on the said first arm, and pivoted by its other end to the said second arm; the said link crossing the plane of the chord-line of the stabilizer; and means for varying the distance of the movable link-pivot from the pivot of the first arm to change the range of the effective movement of the link.

3. In an aircraft: an entire stabilizer pivoted on the fuselage and at a point on the stabilizer adjacent and ahead of its center of pressure; a tab pivotally mounted on the stabilizer; a first arm pivotally mounted adjacent the fuselage and adjacent the plane of the chord-line of the stabilizer and projecting to one side of the said plane; a second arm attached to the tab and projecting to the other side of the said plane; a link pivoted by one end and with a movable pivot on the said first arm and pivoted by its other end to the said second arm, the said link crossing the plane of the chord-line of the stabilizer; and means for varying the distance of the movable link-pivot from the pivot of the first arm to change the range of the effective movement of the link.

4. In an aircraft: an entire stabilizer pivoted on the fuselage and at a point on the stabilizer adjacent and ahead of its center of pressure; a tab pivotally mounted on the stabilizer; a link-motion consisting of a first arm pivotally mounted adjacent the stabilizer pivot, a second arm attached to the tab, and a link flexibly connected to the first arm and to the second arm by its ends, the positions of the arms and pivots being such that the link crosses the line joining the first arm pivot and the tab pivot; and means mounted on the link motion to change the effective length of the first arm.

5. In an aircraft: an entire stabilizer pivoted on the fuselage and at a point on the stabilizer adjacent and ahead of its center of pressure; a tab pivotally mounted on the stabilizer; pilot operable means for rotating the stabilizer on its pivotal point the said means being such as to allow of the moving of the stabilizer by the pressure of the air; a link-motion consisting of a first arm pivotally mounted adjacent the stabilizer pivot, a second arm attached to the tab, and a link connected to the first arm and to the second arm by its ends, the relative positions of the arms the link and the connections being such that the link crosses the line joining the first arm pivot and the tab pivot; and means mounted on the link motion to change the relative length of its links to change the range of the effective movement of the link.

RICHARD H. BURROUGHS, Jr.